US 8,454,419 B1

(12) United States Patent
Smith et al.

(10) Patent No.: US 8,454,419 B1
(45) Date of Patent: Jun. 4, 2013

(54) SYSTEM AND METHOD FOR OPTIMIZING LEARNING BY CORRELATING STRUCTURED KNOWLEDGE AND LEARNING TECHNIQUES WITH PHYSICAL METAPHORS IN AN EDUCATIONAL COMPUTER GAME

(75) Inventors: Stephen J. Smith, Lynnfield, MA (US); Frederick Myers, Winchester, MA (US)

(73) Assignee: G7 Research LLC, Lynnfield, MA (US)

( * ) Notice: Subject to any disclaimer, the term of this patent is extended or adjusted under 35 U.S.C. 154(b) by 110 days.

(21) Appl. No.: 13/212,270

(22) Filed: Aug. 18, 2011

Related U.S. Application Data

(60) Provisional application No. 61/472,813, filed on Apr. 7, 2011.

(51) Int. Cl.
*A63F 13/00* (2006.01)
*G09B 25/00* (2006.01)

(52) U.S. Cl.
USPC .................................. 463/9; 434/72

(58) Field of Classification Search
USPC .................................. 463/9; 434/72
See application file for complete search history.

(56) References Cited

U.S. PATENT DOCUMENTS

| 6,561,811 | B2 | 5/2003 | Rapoza et al. |
| 6,652,283 | B1 | 11/2003 | Van Schaack et al. |
| 6,749,436 | B1 | 6/2004 | Dannenberg |
| 6,890,179 | B2 | 5/2005 | Rogan et al. |
| 6,921,268 | B2 | 7/2005 | Bruno et al. |
| 7,402,105 | B1 | 7/2008 | Hutter et al. |
| 8,251,704 | B2 * | 8/2012 | Woolf et al. .................. 434/322 |
| 2004/0180708 | A1 | 9/2004 | Southard et al. |
| 2005/0200078 | A1 | 9/2005 | Montaldo |

(Continued)

FOREIGN PATENT DOCUMENTS

WO 0233678 A1 4/2002

OTHER PUBLICATIONS

Hicks, Andrew, Towards Social Gaming Methods for Improving Game-based Computer Science Education, FDG 2010—Proceedings of the 5th International Conference on the Foundations of Digital Games, Jun. 19-21, 2010, p. 259-261, Monterey, CA, USA.

(Continued)

*Primary Examiner* — Arthur O. Hall
*Assistant Examiner* — Jeffrey Wong
(74) *Attorney, Agent, or Firm* — Clock Tower Law Group; Erik J. Heels; Michael A. Bartley

(57) ABSTRACT

A system and method for optimizing learning and retention of items learned over time maps bodies of knowledge to physical metaphors in an education computer game or simulation. Entire structured curricula or curriculum frameworks are mapped to isomorphic physical metaphor hierarchies. Recommended sequences through subject matter are mapped to sequences in the physical metaphor of the game or simulation. Various algorithms for computing the well-known Ebbinghaus "spacing effect" for reviewing items that are about to be forgotten by a student to optimize his or her retention of subject matter are mapped to physical metaphors in the game or simulation. The use of a "predator-prey" computer algorithm to find students' subject matter knowledge weak points is mapped to a physical metaphor in the game or simulation. Similarly, devices to enhance the student's learning curve, such as to induce perseverance, or raise motivation via competition, or via praise from an authority figure, are mapped to physical metaphors in the game or simulation.

11 Claims, 12 Drawing Sheets

U.S. PATENT DOCUMENTS

| | | | |
|---|---|---|---|
| 2007/0202484 | A1 | 8/2007 | Toombs et al. |
| 2009/0017426 | A1 | 1/2009 | Higgins |
| 2009/0019078 | A1 | 1/2009 | Chisholm et al. |
| 2010/0035225 | A1 | 2/2010 | Kerfoot, III |

OTHER PUBLICATIONS

Spelling Bees, website, http://www.arcademicsskillbuilders.com/games/spelling-bees/.

Mack, Christopher, Educational Social Games Spread on Social Platforms, website, Jun. 29, 2010, http://www.insidesocialgames.com/2010/06/29/educational-social-games/.

Squire, Kurt, et al., Building a Self-Organizing Game-Based Learning Environment, TechTrends, vol. 49, No. 5, 2005.

Henderson, Lyn, et al., Just Playing a Game? Educational Simulation Software and Cognitive Outcomes, J. Educational Computing Research, vol. 22(1), 105-129, 2000.

Quizarium, website, http://www.quizarium.com.

Wolf, Gary, Want to Remember Everything You'll Ever Learn? Surrender to This Algorithm, Wired Magazine: 16.05, Apr. 21, 2008.

Moseman, Andrew, Hot Science The Best New Science Culture: Books: How Games Will Save the World Reality Is Broken by Jane McGonigal, Discover Magazine, Mar. 5, 2011.

Wikipedia, Spacing Effect, http://en.wikipedia.org/wiki/Spacing_effect, last changed May 8, 2011.

Supermemo, website, http://www.supermemo.com/, website launched in 1997, last software update 2011.

* cited by examiner

Fig 4a

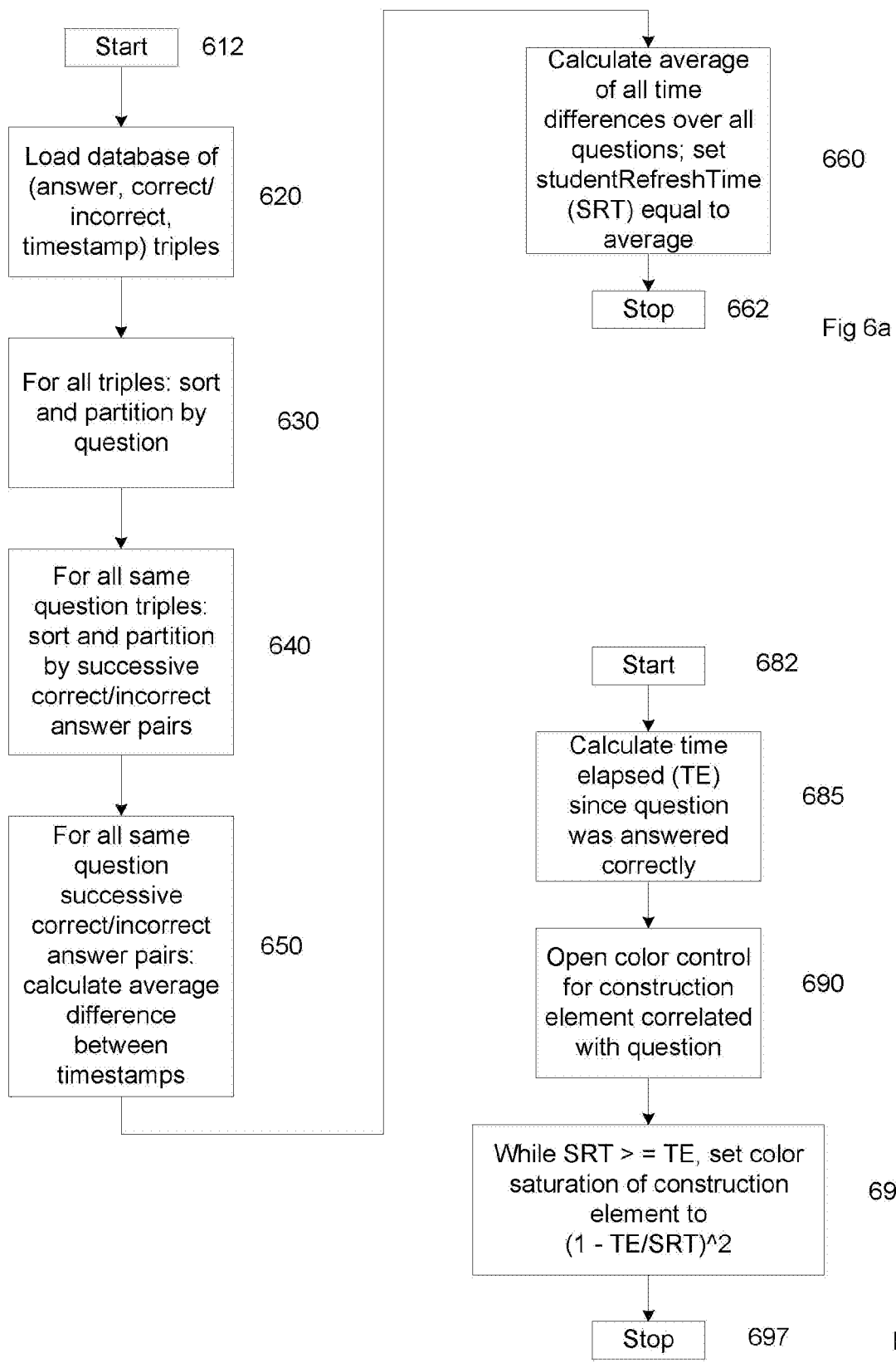

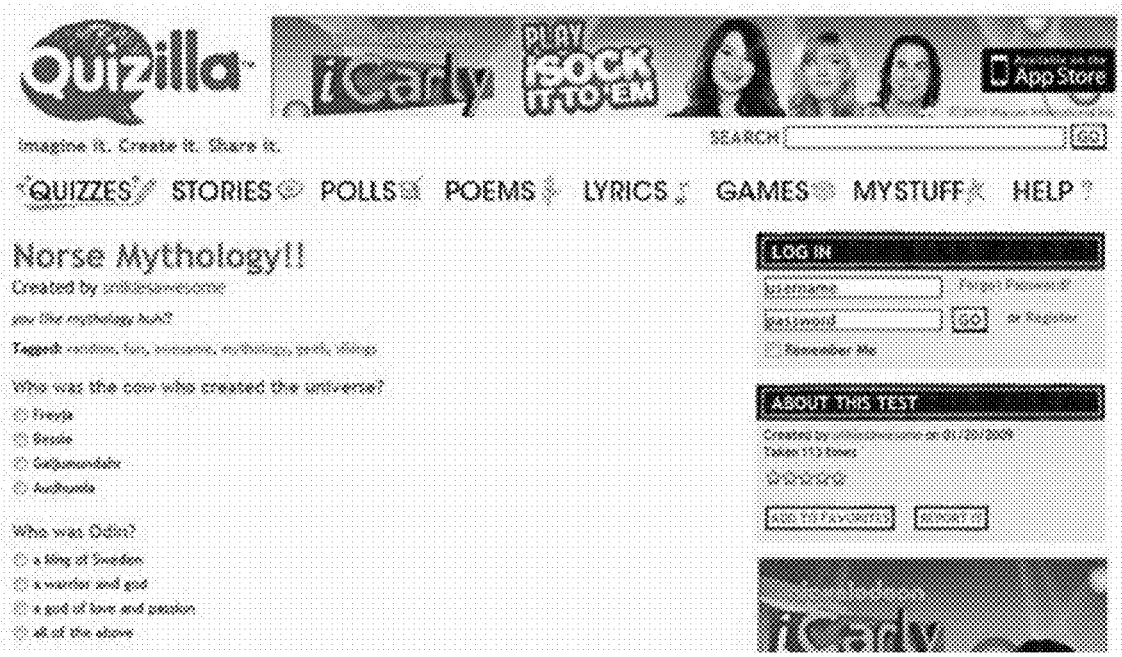
Prior Art   Fig 9
Prior Art   Fig 10

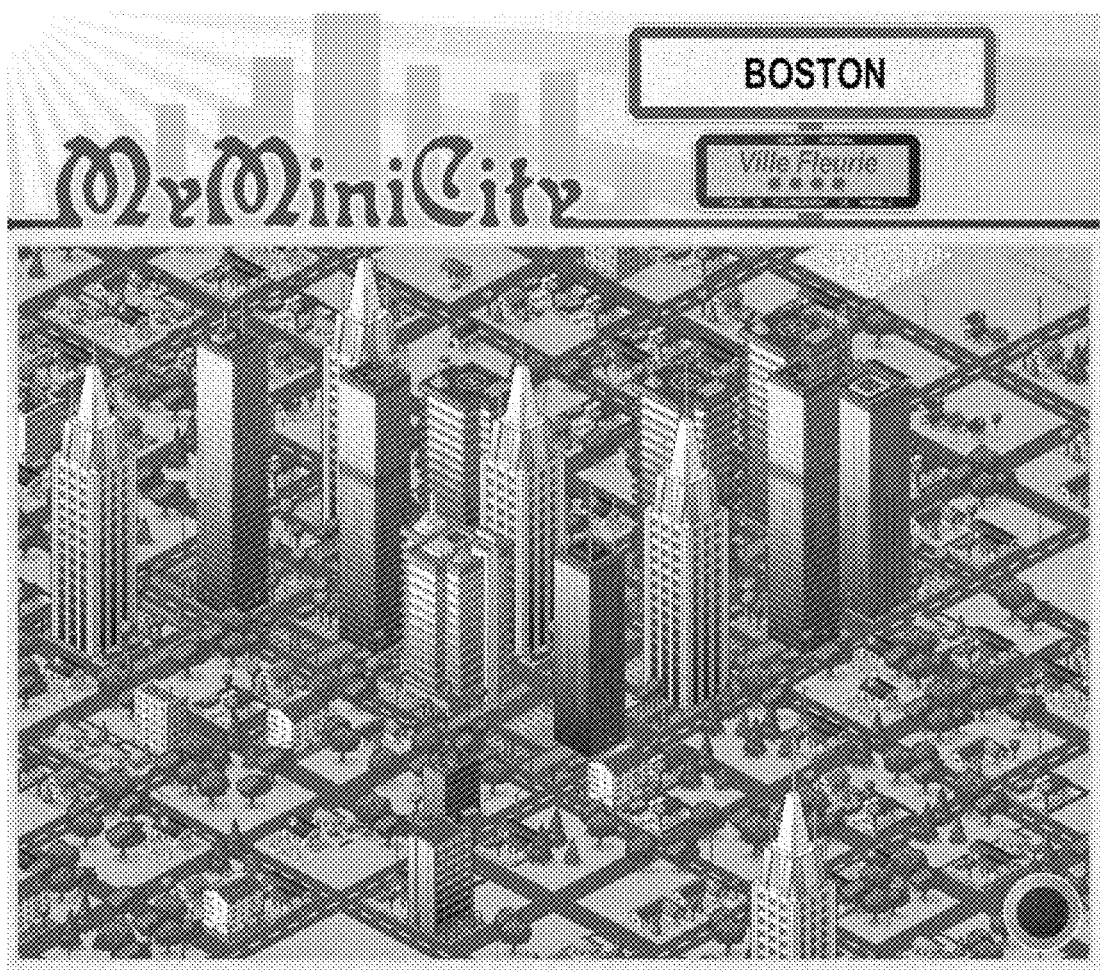
Prior Art Fig 11

SYSTEM AND METHOD FOR OPTIMIZING LEARNING BY CORRELATING STRUCTURED KNOWLEDGE AND LEARNING TECHNIQUES WITH PHYSICAL METAPHORS IN AN EDUCATIONAL COMPUTER GAME

CROSS-REFERENCE TO RELATED APPLICATIONS

This utility patent application claims priority from U.S. provisional patent application Ser. No. 61/472,813, filed Apr. 7, 2011, titled "SYSTEM AND METHOD FOR OPTIMIZING LEARNING BY CORRELATING STRUCTURED KNOWLEDGE AND LEARNING TECHNIQUES WITH PHYSICAL METAPHORS IN AN EDUCATIONAL COMPUTER GAME" in the name of STEPHEN J. SMITH and FREDERICK MYERS, and is herein fully incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2011 Stephen J. Smith and Frederick Myers.

BACKGROUND

1. Field of Technology

The invention applies to the field of computer games, and more specifically to the field of educational computer games and intelligent computer based tutoring systems.

2. Background and Prior Art

A "game" may be defined as "a competitive activity involving skill, chance, or endurance on the part of a participant" and accordingly the term "computer game" is used herein to mean a game played on a computer. Out of all extant computer games, few are educational.

An "educational game" is a game whose express design intent is not only to entertain the player, but also to educate him or her. A game that primarily entertains the user and happens to also have educational content is not an educational game as defined herein. Educational games are a very small subset of all games. Educational game makers have experienced difficulty in combining game elements (called "mechanics"—see next definition) with educational content, often ending up with the worst of both worlds, a game that is boring and does not do a good job of educating the player. In some educational games this undesirable effect results from the game mechanics interfering with or distracting from focusing on the material to be learned.

"Game mechanics" is a term of art meaning the various elements of a game, such as a computer, video, or board game that induce enjoyment and, more generally, motivation to play the game. Game mechanics are responsible for the powerful appeal of games and notably, computer games. Examples of game mechanics in a video game are its scenery, other visual devices such as tools, weapons, people, animals, and other props, its "backstory" (the story "in back of" the visual presentation), a competitive function such as two-player mode or one-player against the computer, or a ticking clock indicating limited time to execute an action before something happens (usually a punishment such as loss of points). Flashcards with no time limit are an example of a learning method that used no game mechanics, while Space Invaders, a complex, best-selling game in which the user must shoot bullets at falling icons (representing extra-terrestrial beings) before they hit the ground, is an example of a game with game mechanics but no intellectual learning component.

Few educational computer programs or intelligent tutoring systems employ the great power of game mechanics to keep students engaged in the system.

A "physical metaphor" in a computer game or simulation is a conceptual representation of a real-world physical object. Often the conceptual representation will be complemented by a graphic representation. For example, a city in a computer game can represent a city in the real world, and a graphic of the city lets the user more easily envision the metaphor. A physical metaphor may be iconic, that is, a minimalistic representation that requires the user to 'fill in the blanks' with their mind, or intentionally realistic, as in many modern computer games and training simulations.

As mentioned, a very small percentage of the computer game market uses game mechanics, and specifically physical metaphors, to keep a student interested in persevering to learn the educational subject material. A portion of the software program, Mavis Beacon Teaches Typing, called Letter Invaders, is one example.

A "structured curriculum" or "curriculum framework" is a term of art in education. The term describes the formal arrangement of granular subject matter in a hierarchical and ordered sequence. An example of a structured curriculum is the United States Common Core State Standards (see www.corestandards.org): "These standards define the knowledge and skills students should have within their K-12 education careers so that they will graduate high school able to succeed in entry-level, credit-bearing academic college courses and in workforce training programs."

Here is a description of the intent of the Common Core mathematics standard for children from Kindergarten to Grade 5: "The K-5 standards provide students with a solid foundation in whole numbers, addition, subtraction, multiplication, division, fractions and decimals—which help young students build the foundation to successfully apply more demanding math concepts and procedures, and move into applications."

Here is an example of the actual Common Core standard, which is hierarchical. The top level is Mathematics, the second level is 7th Grade, the third level is Ratios & Proportional Relationships, the fourth level is "Recognize and represent proportional relationships between quantities," and one example of several on the fifth level is "Decide whether two quantities are in a proportional relationship, e.g., by testing for equivalent ratios in a table or graphing on a coordinate plane and observing whether the graph is a straight line through the origin."

There are similar international and local standards around the world. Another example of a structured curriculum are the hierarchical format of standardized tests, such as the Scholastic Assessment Test (SAT) taken by high school students in preparation for college application, or the Graduate Record Exams (GRE) taken by more than 600,000 test takers across 230 countries, in preparation for graduate school application.

Virtually no educational games systematically map their subject matter to formal structured curricula. At the other end of the spectrum, computer-based training systems incorporate structured curricula, but use few or no game mechanics or physical metaphors to represent curricula.

There are a number of results in the psychological literature that indicate ways to optimize learning and the retention of what a student learns. Some of these results are used in the design of computer programs such as those used in intelligent tutoring systems. However, few are mapped to physical metaphors in educational games.

The "spacing effect," first studied by Hermann Ebbinghaus and published by him in 1885, is a well-known phenomenon in human psychology and the theory of learning. The effect states that long-term recall of learned information is enhanced by presenting the item to be retained at spaced intervals over time as opposed to in a "massed presentation," that is, at one time. Thus a "forgetting curve" showing the amount of information retained versus lost is flattened when the spacing effect is employed in learning. In colloquial terms, "If you can remind someone of something just as they are going to forget it they will remember it for a very long time. Much much longer than if they had just learned it once without any periodic review." ("Want to Remember Everything You'll Ever Learn? Surrender to This Algorithm", Wired Magazine, 2008).

There are computer programs that use the spacing effect to optimize learning by students. U.S. Pat. No. 6,652,283 (Van Schaack) and U.S. Patent Application Pub. No. 2010/0035225 (Kerfoot) are examples of teaching systems that use the spacing effect. There are few examples of prior art in which a learning technique, such as the spacing effect, is mapped to a physical metaphor so as to facilitate its application to human learning.

Supermemo is a computer program that employs the spacing effect as its key feature, reminding the user when to review the facts he or she wants to remember (www.supermemo.com/index.htm). Supermemo does not use game mechanics or a mapping of the spacing effect to a physical metaphor.

FIG. 9 shows an educational website, Quizilla, that uses no game mechanics and no mapping of its body of knowledge to any physical metaphor.

FIG. 10 shows an internet game using the physical metaphor of a city in its name, EducationCity.com, and which uses systems and methods for education, but which, unlike the present invention, lacks a body of knowledge mapped to the physical metaphor in its systems and methods.

FIG. 11 shows an internet game using the physical metaphor of a city, MyMiniCity, but which, unlike the present invention, lacks a body of knowledge mapped to it.

While there currently exists a multi-billion dollar industry supplying non-educational computer games to an avid market, there are virtually no educational computer video games that are sold directly to this market. Educational computer games are notoriously either not fun (lacking compelling game mechanics) or non-educational (a normal game masquerading as educational in order to be purchased by parents). The lament of one of the most successful non-educational video game creators is captured in this quotation: "To McGonigal, the addictive draw of games represents a remarkable opportunity to improve reality, not simply escape from it . . . " (Review of *How Games Will Save the World*, by Jane McGonigal, *Discover* (March 2011)). Few video games have been successful at combining the extraordinary power of game mechanics to motivate a student to continue learning while delivering expressly educational material.

None of the prior art provides a computer game with 1) underlying and primary purpose of education; 2) game mechanics mapped to a real-life metaphor; 3) game mechanics designed to trigger replay of the game; and 4) replay of the game timed to the spacing effect in order to optimize learning.

What is needed, therefore, is an educational video game that overcomes the above-mentioned limitations and that includes the features enumerated above.

BRIEF SUMMARY

Disclosed herein is a system and method for optimizing learning and a student's retention of items learned over time. The method combines the powerful draw of computer games with learning techniques. One embodiment may map bodies of knowledge to physical metaphors in an educational computer game or simulation, thereby permitting the use of game mechanics to motivate the student to learn. A further embodiment may correlate entire structured curricula or curriculum frameworks to physical metaphor hierarchies. Recommended sequences through subject matter may be mapped to sequences in the physical metaphor of the game or simulation. Various algorithms for computing the Ebbinghaus "spacing effect" for reviewing items that are about to be forgotten by a student to optimize his or her retention of subject matter may be mapped to physical metaphors in the game or simulation. The use of a "predator-prey" computer algorithm to find students' subject matter knowledge weak points may be mapped to a physical metaphor in the game or simulation. Similarly, devices to enhance the student's learning curve, such as to induce or raise motivation via competition, or via praise from an authority figure, may be mapped to physical metaphors in the game or simulation.

BRIEF DESCRIPTION OF THE DRAWINGS

FIG. 4a shows a chart segregating 100 questions in a subject to 10 levels of 10 bricks each in a building, the tower in FIG. 3.

FIG. 4b shows a creation interface connecting questions and details to the chart of FIG. 4a.

FIGS. 6a and 6b show flowcharts of key steps in two algorithms that affect the mapping schematic in FIG. 5, specifically in this case for mapping the Ebbinghaus "spacing effect" to a physical metaphor, such as bricks in a building.

FIG. 9 shows the prior art of an educational website, Quizilla.

FIG. 10 shows the prior art of an internet game using the physical metaphor of a city in its name, EducationCity.com.

FIG. 11 shows the prior art of an internet game, MyMiniCity, using the physical metaphor of a city.

DETAILED DESCRIPTION, INCLUDING THE PREFERRED EMBODIMENT

In the following detailed description, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

The present invention incorporates innovations in systems and methods in which information to be recalled at will by a student is presented along with game mechanics.

Figure 8:
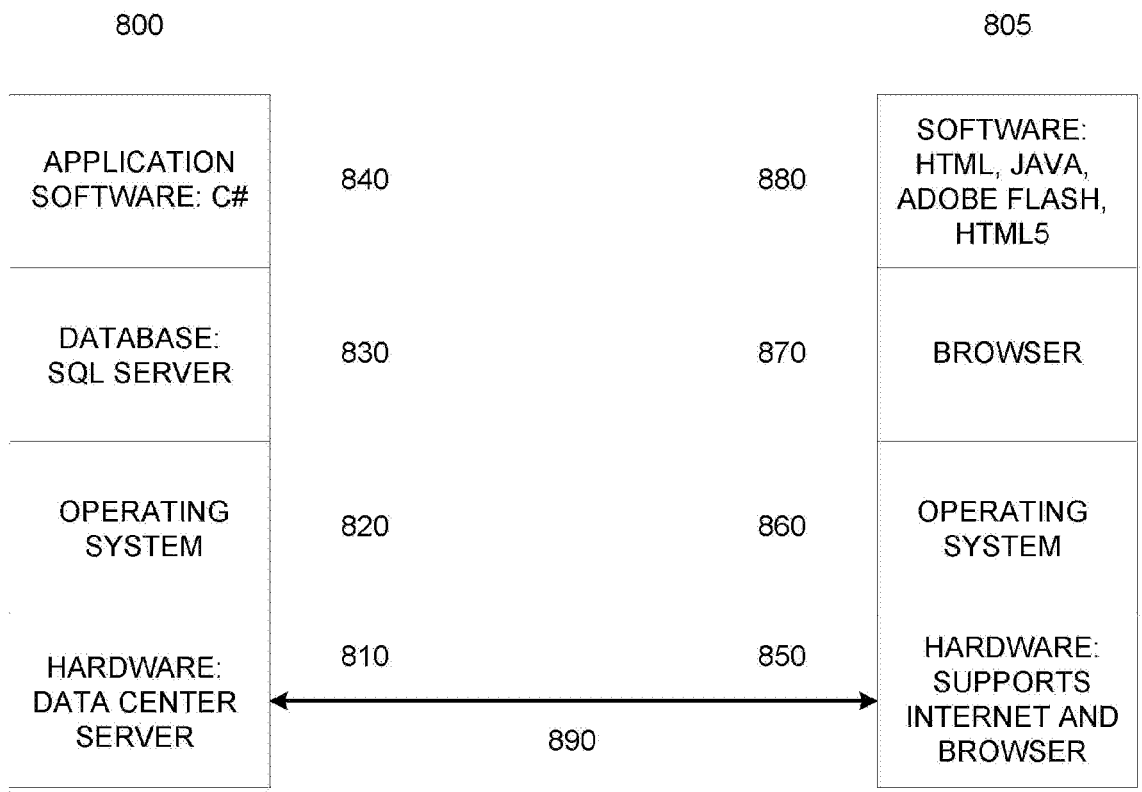
FIG. 8 shows a recommended architecture consisting of a server side, a client side, and an internet connection between the two.

Embodiments may be implemented via a variety of hardware and software architectures. Such architectures have changed rapidly over recent years. The preferred embodiment described may be changed by those of ordinary programming skill to adapt to changes in prevailing technology and technique. Referring to FIG. 8, the preferred architecture is segregated into a server side 800 and a client side 805. The application uses on-demand cloud computing means to scale dynamically based upon user load.

The preferred computer hardware on the server-side is cloud-based, meaning is located remotely from the designers and users, and resides on SAS 70 compliant data center servers 810 supporting an internet connection 890. The software on the server side consists of an operating system 820, Windows Server 2008, a database 830 such as SQL Server containing user information and subject matter data, and web and application server software 840. The preferred implementation is an Internet application first accessed through a web page served by the web server. A user interacts with the web page to log in to the system and access the application. The application server delivers the client application software and interacts with the database and web server to, as will be discussed below, a) provide and manage appropriate accessible content including questions, answers, cities, and towers, including current completion levels and decay status; b) track user performance including correct and incorrect answers and progression through content; c) deliver and track reward information after successful completion of content; d) deliver challenge and communication such as "praise me" messages through email, text notification, social environment such as Facebook messages, or other communication methods; e) track new content including questions, answers, and groupings of questions, as entered and edited by content creators; and f) manage a web commerce platform both through virtual currency allowing purchase of rewards from earned coins and purchase of access to commercial content such as towers accessible only by purchase.

The preferred computer hardware on the client side is any hardware platform 850, such as a PC, Mac, Unix, Linux, PDA varieties, tablet varieties, etc., supporting an internet connection 890, an operating system 860 and an internet browser 870.

The preferred client application software 880 consists of HTML, Java, and for animation Adobe Flash AS3 code, while other animation software such as HTML5 can be easily implemented. The client application software renders the user interface, receives all input from a user and sends such input information to the server for appropriate response and tracking.

Alternative to the client-server model, the game may be bundled as a complete executable deliverable on computer-readable media to any computing device. The entire operation, including material delivery and interface presentation, may then be executed by a single client program. Questions, answers, and performance history may all be stored and tracked by the single program. Remote database communication may be enabled to access material updates and historical performance updates to better tune spacing theory decay determinations.

Referring to FIG. 1, a subject of knowledge 110 is mapped 130 to a physical metaphor 120. The behavior of physical metaphor 120 is designed to mirror physical behavior of the object it represents in the real world so that unexpected behavior does not distract the student from learning the knowledge desired. A preferred embodiment is JogNog, an educational game and intelligent tutoring system that uses game mechanics to keep the learner interested and persevering in their learning while presenting the information to be learned in an easy-to-assimilate format.

Figure 2:
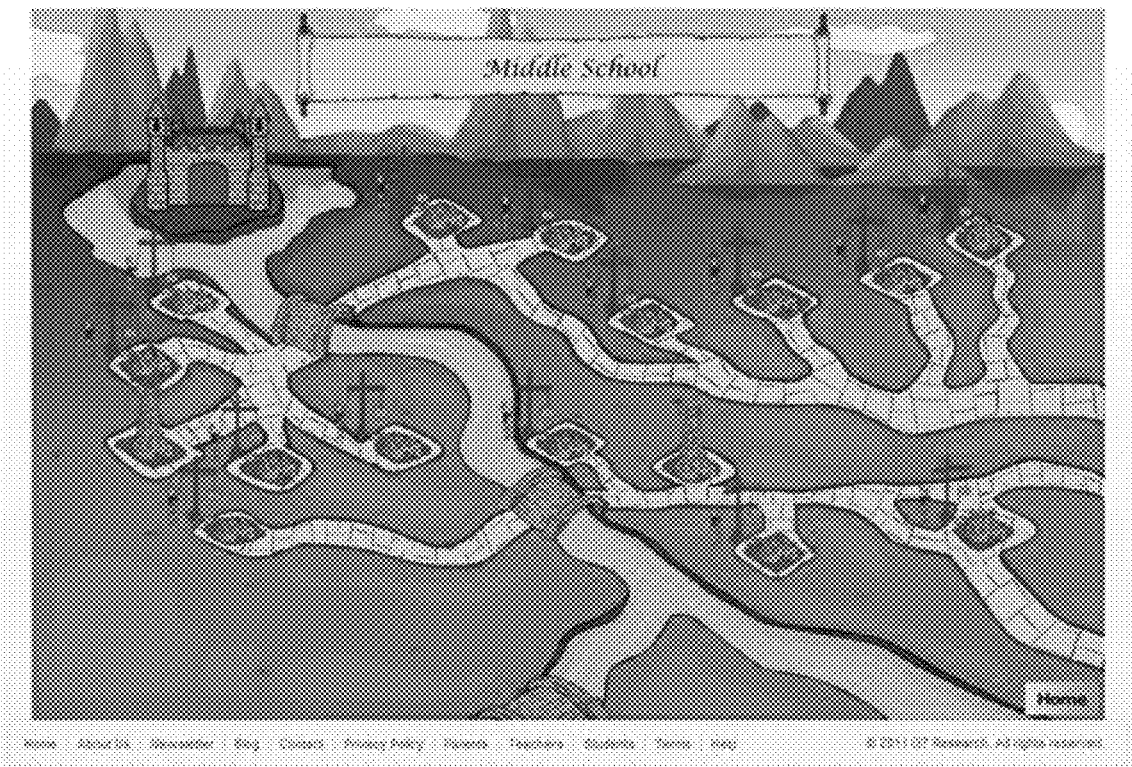
FIG. 2 shows the mapping of a hierarchical body of knowledge to a physical metaphor hierarchy, in this case, subjects from the Massachusetts Curriculum Frameworks for students in grades 6, 7, and 8, to buildings in a city in a screenshot of an embodiment of the present disclosure.
Figure 3:
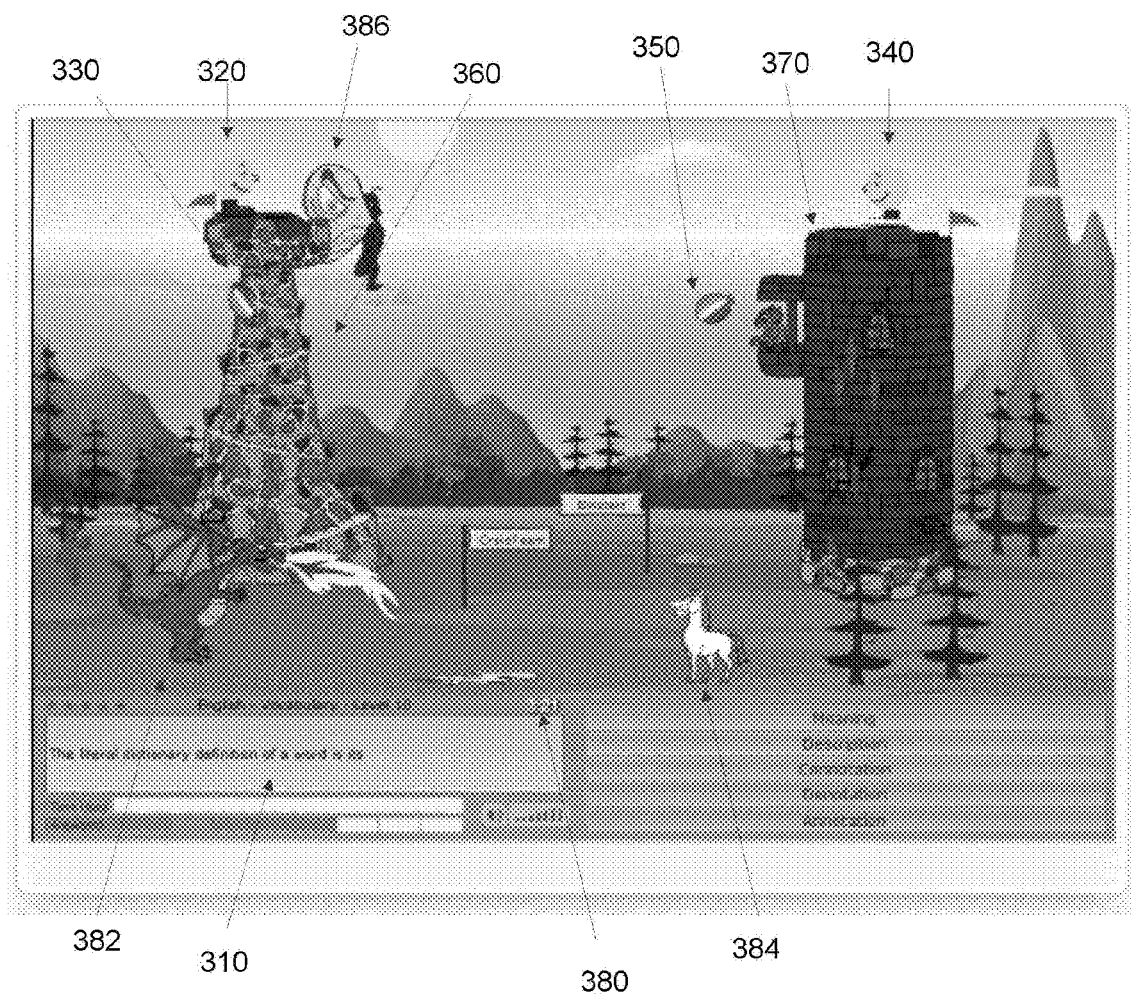
FIG. 3 shows a screenshot of the main game page JogNog, in which mappings of knowledge and game mechanics to a physical metaphor are employed.

In the intelligent tutoring system, JogNog, one aspect maps a body of knowledge 110 to a metaphorical city 120 as represented by FIG. 2. JogNog stores, manages, and organizes questions and answers making up levels, courses, and curricula, in a server-side database, and delivers the questions and receives trackable results from a client software application delivered in the form of a browser-based user interface. In the system, as a student answers questions as part of playing a computer game, he builds his city of knowledge, represented by a growing iconic city in the game. Referring also to FIG. 3, the mapping of knowledge to a physical metaphor is embedded in the game, for instance, if a student 320 answers questions 310 incorrectly, his weapon misfires water balloons 330, which are one of many possible embodiment weapons, tools, implements or the like, while the weapon of opponent 340 fires water balloons correctly 350 and damages student building 360. If the student instead answered correctly, the opposite effect happens and the student's weapon fires correctly and damages the opponent's building 370.

The preferred embodiment uses multiple game mechanics to make learning more interesting for the student: the reward of achieving a given level of knowledge and concomitant level of construction of the tower, the pressure of a limited time 383 to complete the level, enhancements of the aesthetic game elements such as a dragon 382, unicorn 384, and goblin 386, a Bonus button, which allows the student to challenge a friend to compete with him in the educational game, and a reward of receiving "gold coins" for the student's achievements throughout the game.

Figure 1A:
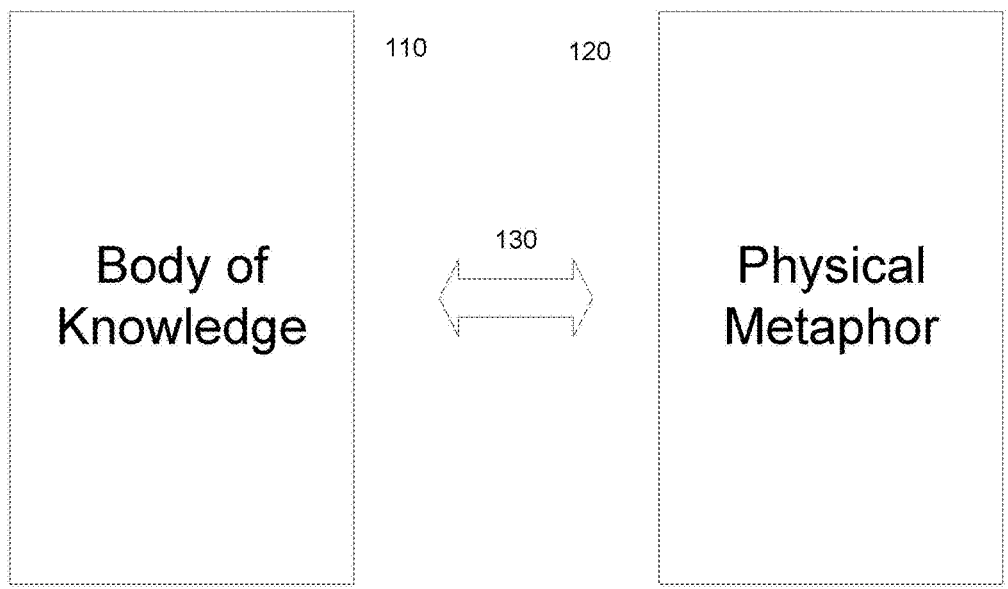
FIG. 1a is a schematic showing the mapping of a body of knowledge to a physical metaphor.
Figure 1B:
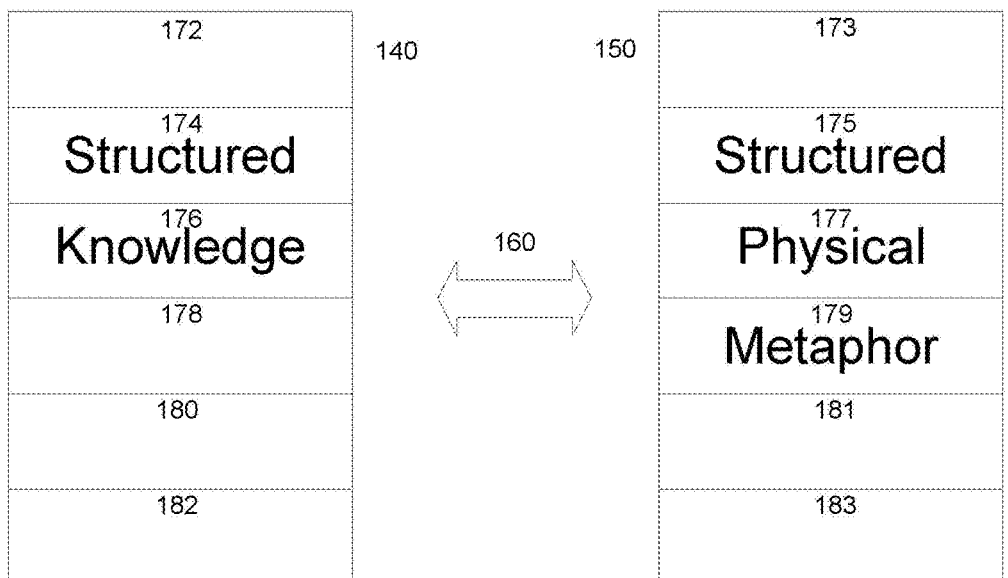
FIG. 1b is a schematic showing the mapping of a structured body of knowledge to a structured physical metaphor.

Referring also to FIG. 1b, a mapping 160 from a hierarchy of knowledge 140 to a physical hierarchy 150 can be depicted in the visual and conceptual elements of a game. While the method of mapping a body of knowledge to a physical metaphor, as in FIG. 1a, is one way to open the door to using a powerful set of game mechanics to keep students engaged in learning, a significant refinement is mapping 160 a structured body of knowledge 140 to a structured physical metaphor 150 because often knowledge is structured and the structure is critical to understanding the knowledge and retaining it. Elements of structured elements 140 are shown as levels within the body of knowledge, which for example could be quite coarse-grained as levels in a hierarchy such as the typical progression from Kindergarten to graduate school, or quite fine-grained as for example in the progression within an $8^{th}$ grade mathematics textbook. The structured elements may be mapped 160 to their counterparts in the structured physical metaphor 150 as pairs (172, 173), (174, 175), (176, 177), (178, 179), (180, 181), and (182, 183), where the pairs symbolize a correspondence between elements of the knowledge and elements of the game Often the important structure of knowledge is hierarchical. Around the world, the entire body of knowledge presented to school children from kindergarten to graduate school is hierarchical. As another example, the curriculum of medical schools is hierarchical from pre-med to general medical knowledge to specialty, such as neurology, to sub-specialty, such as movement disorders within neurology.

Accordingly, a preferred embodiment uses the metaphor of a "city of knowledge" to represent an organization of subjects such as those appropriate for elementary school or high school, or a more specific subject area such as 7th grade mathematics. Within the city are more specific subject groupings such as 7th grade mathematics, or a 7th grade mathematics textbook, or chapters of a 7th grade mathematics textbook which for example may be represented by buildings such as towers, topics within the chapter which may be represented as levels or stories of the building, and items of knowledge within the topics which may be represented by bricks. Different types of buildings may represent other facets of the subjects or simply offer variety to the user to keep him interested in persevering to learn.

The bottom level of the preferred hierarchy is represented by the structural elements of the buildings, such as bricks within towers. These lower-level components represent individual facts, or cued question-and-answer pairs, such as "How much is 3 raised to the 3rd power?" paired with a correct answer "27" or an incorrect answer "9." Thus city->tower->level represents three hierarchical levels, with bricks representing a fourth and additional higher levels possible above the city. A higher-level mapping may be achieved with states or provinces, countries, a world, planets, solar systems, groups of stars, galaxies, etc.

Many different mappings from the organization of a subject of knowledge to a physical structure in a game or simulation are possible, each being an embodiment of the invention.

Another significant aspect of many bodies of knowledge is their sequence, which is often a logical sequence. In younger schoolchildren's curricula, the sequence is important because of their intellectual development. In mathematics, for instance, many subjects depend on others, and there is a rigid logical sequence through the material. Just one of many examples is the recommended sequence of pre-calculus before calculus. But the entire kindergarten to graduate school curriculum is another example of a recommended subject sequence, and there are many sub-sequences within the varieties of that curriculum around the world.

Figure 4A:
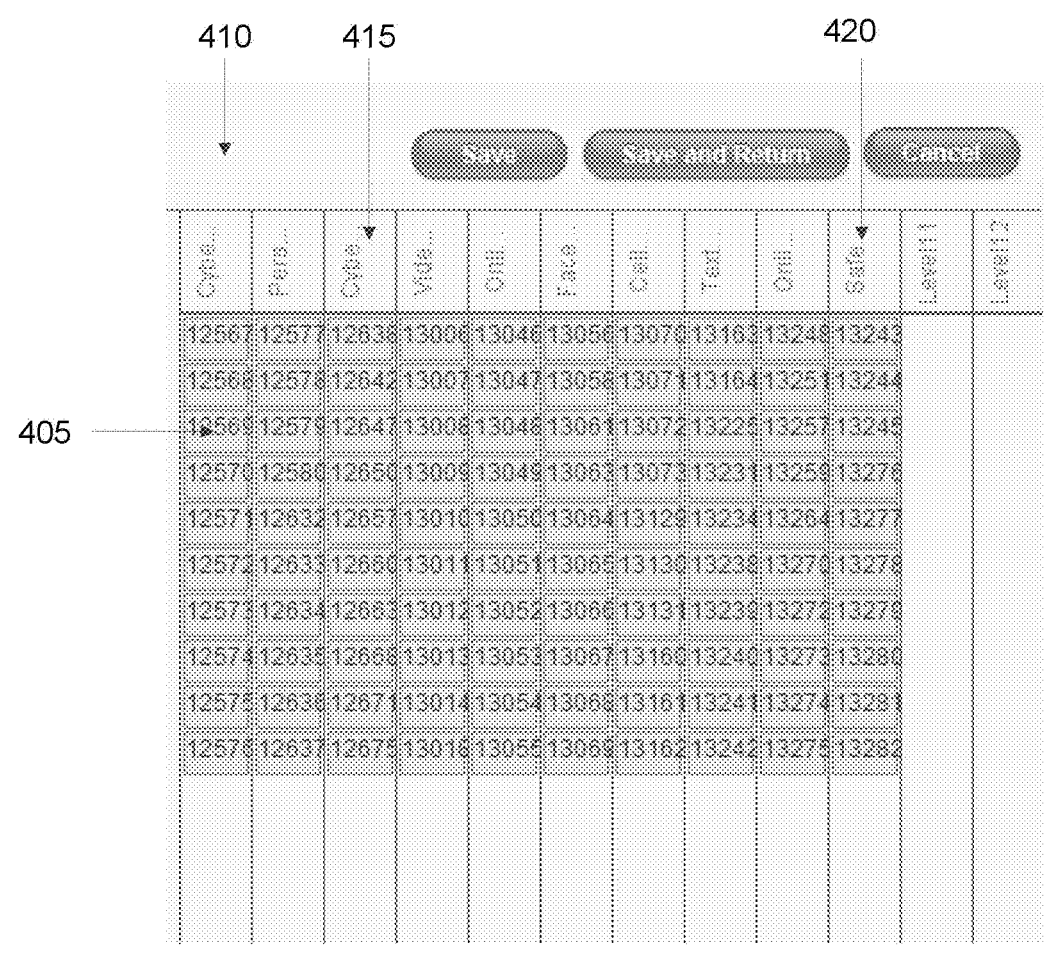

Thus a further enhancement is the mapping of a subject or intellectual content to a structured physical metaphor using a recommended sequence. The preferred embodiment is the structure and sequence implemented in the game JogNog, where in many subjects the knowledge is mapped, as shown in FIG. 4*a*, to a building organized into ten levels, each containing ten questions, for example, 405, which is the third question in the first level. While the order of the questions within each level may be fixed or vary during different plays of the game, the questions contained in each level remain fixed, and so at the level of groups of questions and answers, the same sequence is always presented to all students. In the case of a curriculum framework, or a textbook, the sequence in the game may mirror that used in the framework or textbook. Questions are organized into levels. The levels are organized vertically in FIG. 4*a*, such as column 410 representing level 1, column 415 representing level 3, and column 420 representing level 10, and map to representative structures such as vertical building levels as depicted in the building shown in FIG. 3.

As a student works from Level 1 to Level 10, he or she may be working through a recommended subject matter sequence. Progress from one level to the next may be opened after successfully completing a pre-determined number of questions, such as 80 percent, at one level within a pre-determined time frame. As levels are successfully completed, completion may be graphically represented by completion or addition of a graphical section or level in the structure such as the tower.

Figure 4B:
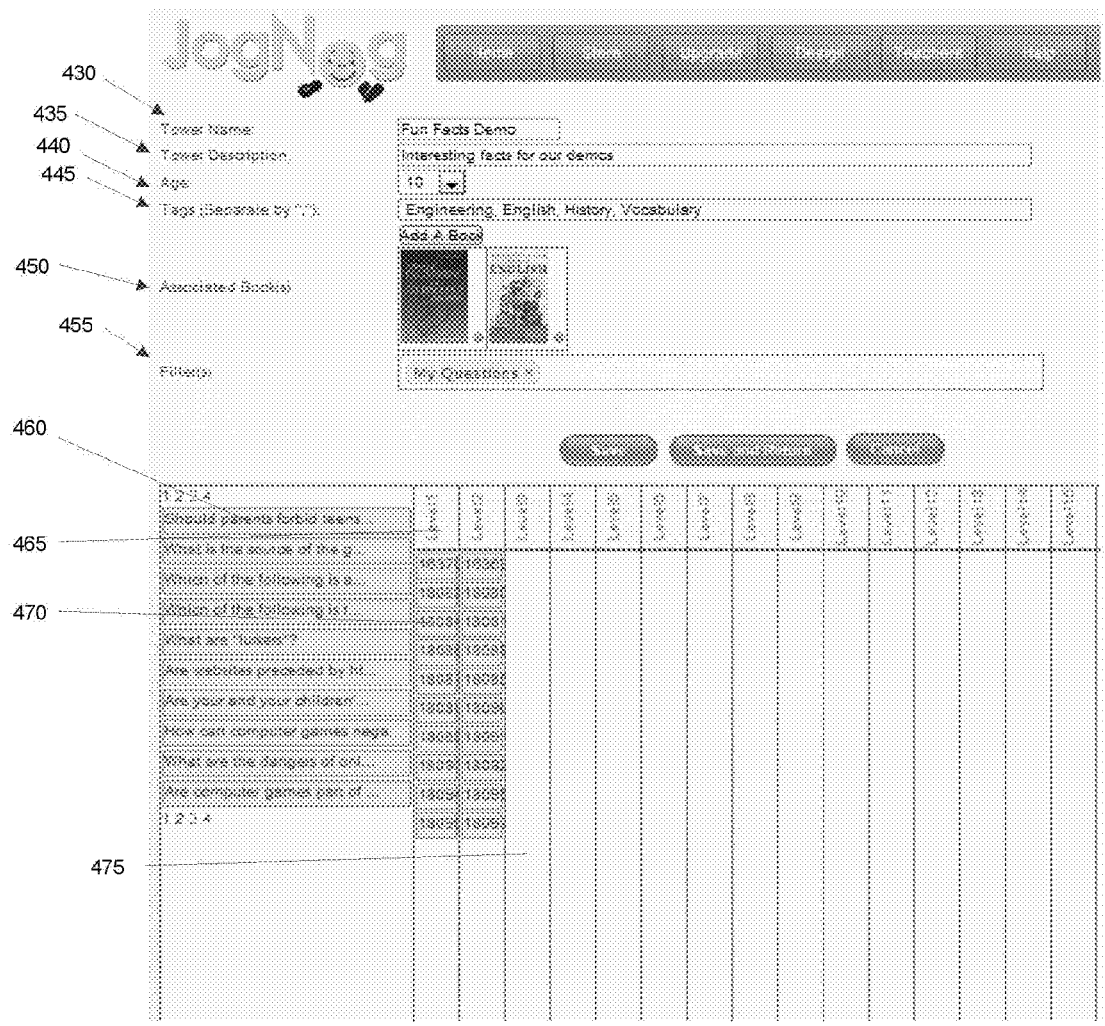
Figure 4C:
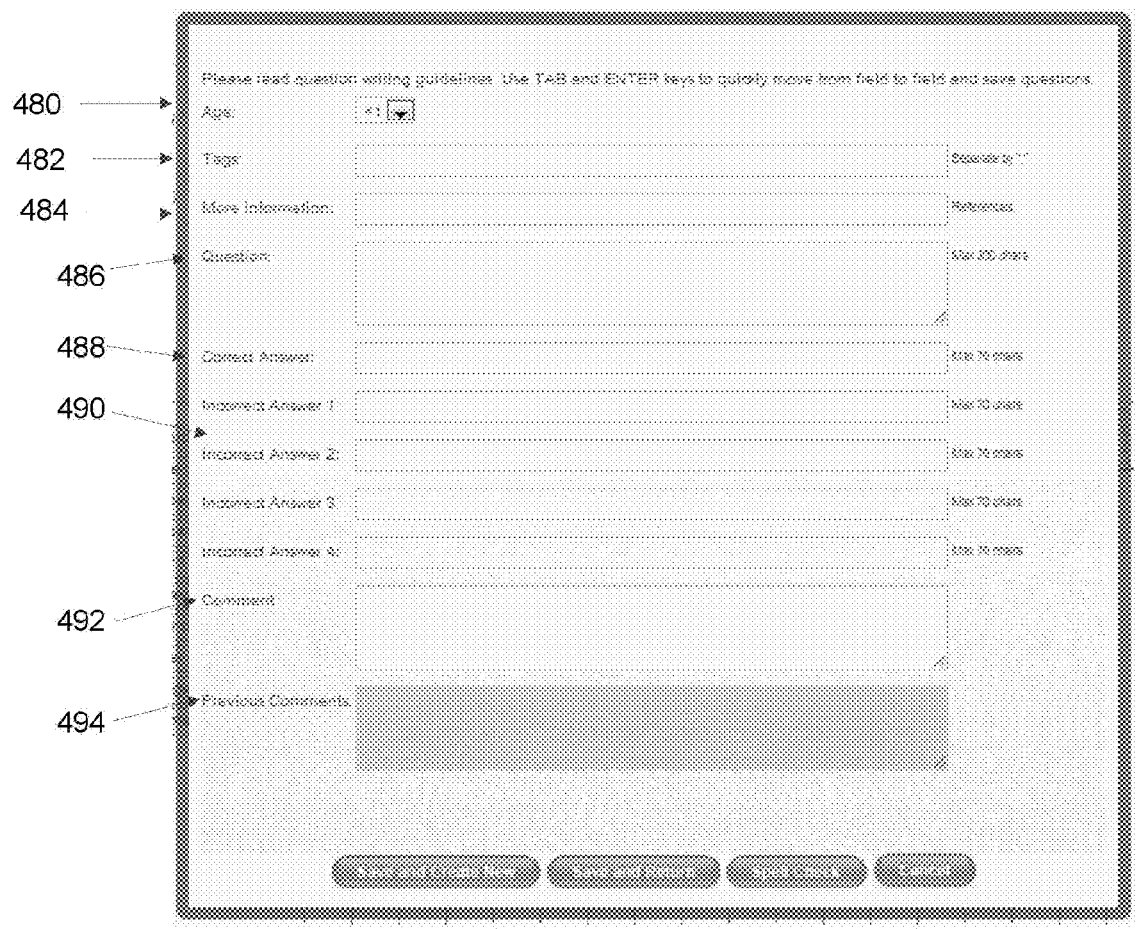
FIG. 4c shows a creation interface for creating a new question.
Figure 5A:
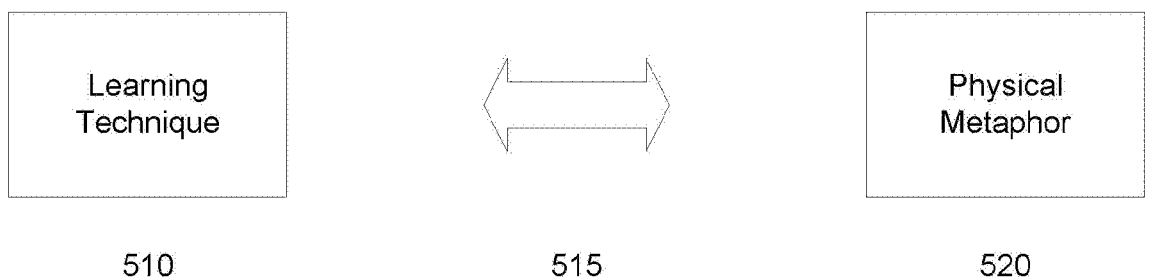
FIG. 5a is a schematic showing the mapping of a learning technique to a physical metaphor.
Figure 5B:
FIG. 5b shows a screenshot of the physical metaphor of an educational game topic.

Referring also to FIG. 5*a*, a further enhancement is the mapping 515 of learning techniques and effects 510 to a physical metaphor 520 such as a graphical representation of a real-world structure. Referring also to FIG. 5*b*, the icon of a tower 530 is linked to, and represents, a tower in the city of knowledge depicted in FIG. 2. In FIG. 5*b*, the tower levels 540 of tower and subject matter 550 are represented by blocks mapped to the tower levels and subject matter in, for example, the columns of FIG. 4, such as 410, 415, and 420, which in turn are mapped to the physical metaphor in FIG. 3, for example, the tower 360 and its 10 levels. One benefit of mapping knowledge to the user is an easier understanding, memorization, and recall of subject matter organization. Another benefit is permitting the incorporation of powerful game mechanics into the learning process via physical metaphors.

Learning effects may also be mapped to physical metaphors. In a preferred embodiment, the Ebbinghaus spacing effect is incorporated into a learning game or simulation. While the great efficacy of the spacing effect in preserving memory is noted in the psychological literature, it is also noted that it is difficult to implement a consistent system for reminding the student at the right moment, that is, when he is about to forget the item he wants to remember. Several enhancements include algorithms for reminding the student when he or she needs to review knowledge for its optimal retention, and the usage of game mechanics, including but not limited to mapping the spacing effect to physical metaphors of structured curricula, to do so.

One such algorithm statistically sums all data from the user database with regard to a given subject, notes when students have missed questions in that subject as a function of the time after they last successfully memorized, learned, or completed the subject to a given standard (such as percentage correct), and derives from that data a predictive factor for the "forgetting curve" over time.

A second such algorithm performs a similar function for an individual student, statistically aggregating all of their missed questions over all subjects as a function of time after they have last memorized, learned, or completed subjects to a given standard (such as percentage correct), and derives from that data a predictive factor unique to them for their forgetting curve over time.

A third such algorithm statistically sums all data from the user database with regard to all subjects, notes when students have missed questions across all subjects as a function of the time after they have last memorized them to a given standard (such as percentage correct), and derives from that data a predictive factor for the "forgetting curve" across all subjects over time.

Referring also to FIG. 6*a*, a generic form of these first three algorithms is shown. After start 612, the program loads 620 the database of stored triple fields of answer, whether that answer was correct or incorrect, and the time at which the answer was given. All such triples are then sorted 630 by question and partitioned into lists with the same question. Next, each same-question list is sorted 640 by correct or incorrect answer, and again partitioned into a list of correctly answered questions or incorrectly answered questions. Then the average difference between time of correct answer and time of incorrect answer is calculated 650. A threshold or floor also may be applied which the time difference must exceed to exclude trivial outliers from the average taken. Finally, the average time difference across all correct-incorrect question time differences is calculated 660, the quantity Student Refresh Time is set equal to that average, and the process halts 662. This Student Refresh Time may be keyed to the subject, individual student, or across all subjects as detailed above, or may be focused down to time results of individual questions.

Additional spacing effect algorithms or variations may be implemented. One variation additionally correlates age groups with subjects to derive forgetting curves and therefore optimal review frequencies for age group by subject.

After calculating a Refresh Time for the spacing effect, the resulting times may be mapped to a physical metaphor representing the subject matter and variations of that physical metaphor, as per examples given below, to indicate to the student the optimal time to review a given subject.

After an initial presentation of items to be learned, the same items are re-presented over time in accordance with the prescription of the spacing effect. The preferred embodiment maps the predicted decay over time of memory of the learned items to the deterioration of the physical metaphor used to represent the hierarchy of subject knowledge. This may be done using a statistical mapping, in other words, in accordance with the frequency predicted by spacing effect research, random elements of the physical metaphor representing knowledge deteriorate over time. An example is a city or building falling into disrepair, in which the amount of disrepair is proportional to the amount of forgetting of learned items shown in spacing effect studies.

In another alternative the mapping the spacing effect to a physical hierarchy is through identifying specific physical elements as items being forgotten in the student's memory. An example is representing those items which the student had the most difficulty learning in the initial presentation with crumbling bricks in a building, with the state of crumbling being proportional to the predicted loss of recall over time. The degree to which buildings are crumbling may be signaled as a physical metaphor by various devices, such as a color change, where a remembered fact is portrayed by a brick at the darkest color, while a brick that is about to crumble, a metaphor for about to be forgotten, is portrayed by the lightest color. In an alternative embodiment the physical material of the bricks may change to indicate memory deterioration, transforming stronger materials to weaker as memory deteriorates, or vice versa as students strengthen their memory. The strongest materials, such shiny titanium steel, indicate that students have refreshed their memory in accordance with the spacing effect to the point where further deterioration is minimal. In this example the student may easily identify items for which he or she would benefit by re-presentation in the game or simulation by state of deterioration, and request re-presentation in time for memory to be reinforced as predicted by spacing effect studies.

Concomitantly, as a student addresses the physical metaphor reminders that knowledge is crumbling by successfully answering the questions indicated by the crumbling bricks, the bricks' color and structural integrity may be restored, rewarding the student for refreshing knowledge at the optimal time and motivating his pursuit to retain his knowledge.

Many mapping mechanisms for motivating a student or otherwise optimizing learning are possible. For instance, in the case of the spacing effect, the spacing effect and the decay game mechanic may be implemented over several phases with each phase creating more refined and optimized implementations of the spacing effect.

Phase 1—One Reminder Global Decay. After a tower level has been completed the corresponding segment on a Towers Page may turn from white to blue to signify completion. After a pre-set fixed period, such as one week, after the tower level has been completed the color may transition from blue to gray signifying that the level has 'decayed' and must be replayed. Once the level is successfully re-played after it has decayed and the color is reset to blue it does not decay again.

Phase 2—One Reminder Global Decay Based on Population Learning. Like Phase 1 but rather than the decay after a fixed period, the tower level may be deemed to have decayed based on a calculation across the population to see how long the reminder should be so that a fixed percentage, such as 80%, of the players can successfully rebuild the level on their first try.

Phase 3—Multi Reminder Global Decay Based on Population Learning. Like Phase 2 but instead of a single reminder, two or more reminding points are required from the user spaced at longer and longer time periods for the later reminders. The optimal time period can be calculated as for the first reminder point in Phase 2, or using a different formula.

Phase 4—Graphical Mapping of Decay. Phase 4 operates like Phase 3 but now the towers themselves, not just on the towers page, but in game play and in the city view may show visible decay when they need to be replayed. The towers may completely collapse if they have been neglected for too long, such as when only a much lower calculated percentage, such as 40% or lower, of the players can successfully rebuild on their first try.

Phase 5—Personalized Spacing Based on Cohorts. This method works like Phase 4 but now the player may be grouped into cohorts of similar players who need similar reminding schedules. The cohorts are built through clustering and memory based reasoning models. For instance, the similarity one player to another may be their score on the reminder scale for all players for each tower. In other words, players whose retention over time of a given subject (the tower) is similar may be grouped together and reminded in similar time frames (a one dimensional similarity metric). A more sophisticated similarity algorithm may use more dimensions. For instance, if two players had difficulty rebuilding their levels on the first try for a particular level (a second dimension) or type of tower (a third dimension) and did very well on others (more dimensions)—they would cluster into the same cohort. This cohort then can be viewed as the new universe and the previous reminder algorithms based on the spacing effect may be used within that universe.

Phase 6—Optimization of Social and Motivational Dynamics. Like Phase 5, Phase 6 considers external motivational issues in the definition of cohorts. For instance, some players may be avid garners who play the game many hours per week and expect their towers to crumble if they are not repaired, while others may be 'casual gamers' who would have little patience and would become de-motivated if they came back and saw their city had collapsed. A simple way to separate players into cohorts is a commonly-used metric in the video-game industry, average hours played per week, which may work for identifying and dividing avid and casual gamers. Another metric from the game industry that may work for defining a cohort of infrequent players is re-acquisition, meaning re-acquiring a player who has not played the game within a defined time frame, such as a month.

Referring also to FIG. 6b, an example algorithm for effecting the mapping of deteriorating item memory with a physical metaphor of deterioration is shown. At start 682, the process calculates 685 the Time Elapsed (TE) since a question was answered correctly by a student. The next step is opening 690 a color selector for the construction element in which the deterioration is to be depicted symbolically, such as a brick in a building that represents the question. So long as the condition is met that Student Refresh Time (SRT) is greater than or equal to time elapsed, the color saturation of the construction element is set 695 in proportion to a mapping formula, such as $(1-TE/SRT)^2$ and then the process halts 697.

Figure 7A:
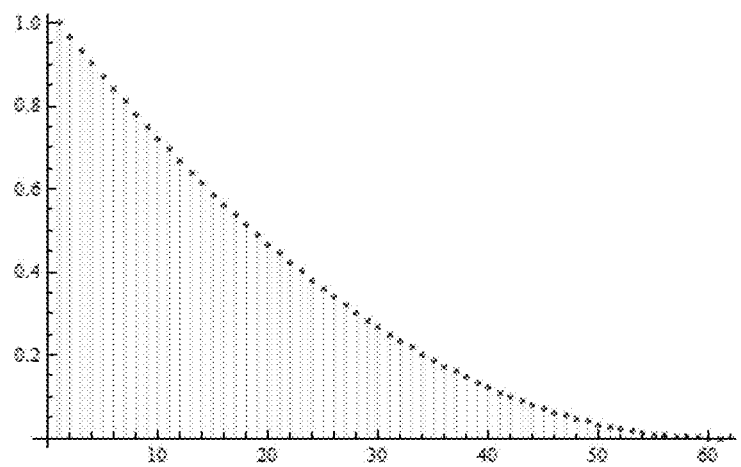
FIG. 7a shows a graph of one of many possible formulas for lightening the color of construction materials to represent the mapping of memory deterioration to a physical metaphor, for example a brick in a building.
Figure 7B:
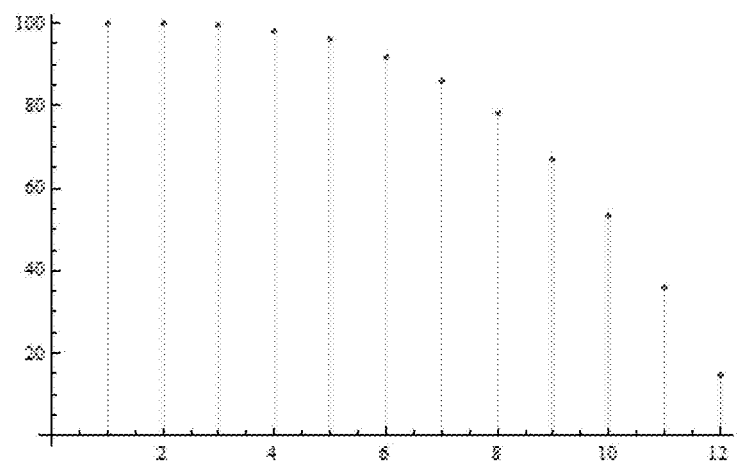
FIG. 7b shows a graph for an alternative embodiment formula that accelerates the deterioration mapping.

The particular mapping in proportion to the formula $(1-TE/SRT)^2$ is shown in FIG. 7a, where the x-axis (horizontal) measures the passage of time for instance in days and therefore also measures the predicted memory decay, while the y-axis (vertical, scale 0-1) measures the saturation (lightness or darkness) of the physical metaphor to which the memory decay is mapped, for instance, the lightness or darkness of bricks in a building. Many other formulas are possible. For example, $(SRT-TE^3)$ is an alternate formula, graphed in FIG. 7b and here using a scale in days, which initially slows the visible representation of memory decay (such as through color saturation, here on a scale of 1-100) and then, based on the mapped formula, accelerates the deterioration mapping.

In either case the student is cued to their statistically probable memory deterioration, and induced to refresh their memory in accordance with the prescription of the Ebbinghaus spacing effect, by the color of the bricks representing their knowledge and the potential for either building collapse or challenge from an opponent to their weakened subject matter knowledge. Challenge from an opponent fits within an example of a predator-prey model. An algorithm may, for instance, attempt to find the weak points of an opponent. Some such algorithms are "self-adaptive," meaning as an opponent learns to shore up weak points that the algorithm finds, the algorithm learns new ways to identify weak points.

Thus a further game enhancement is the use of one or more predator-prey computer algorithms to identify a student's weak points. One algorithm ranks questions the student has answered wrong the most times and causes the physical metaphor to reflect those questions. Another predator-prey algorithm flags probable items that may have been forgotten as predicted by the spacing effect. In a preferred embodiment, decaying structural elements of cities or buildings are examples of ways a self-adaptive predator-prey algorithm can signify a student's weak point to either a computer or human challenger using a physical metaphor.

The physical metaphor of a decayed or dilapidated city or tower signifies a potentially weak point for a challenge from an opponent. Through this metaphor a student is motivated to review knowledge and keep buildings and cities strong, both through pride, fear of failure, and competitive instincts instilled by an imagined or real attack. Predator-prey is one means of introducing competition.

Competition is an integral part of game playing motivation, and can be a powerful motivator to learn, such as to know more than your opponent, or to learn faster than your opponent. Competition may be mapped to physical metaphors in several respects. One is the use of mapping the opponent's state and progress in learning to the physical metaphor of a building. A second such device is a Challenge function that is available to a student, which issues an email as well as logging a challenge in the chosen opponent's account, and can be signified by the physical metaphor of a thrown gauntlet. Challenges can also be issued from one group to another, such as from one school class, to another, which can be represented by the physical metaphor of stealing the opponent team's banner. A third competitive device may permit the students to compete to get to their next level of whatever portion of a structured framework they are studying, as opposed to competing on the same level of the same structured framework. This device optimizes student motivation by "leveling the playing field" and not requiring a student to compete on either a level that is too easy or too difficult for her current level of knowledge.

An additional option is the function of collapsing a building if its level of correctly remembered knowledge, as predicted by the spacing effect or other learning theory, has fallen below a certain level, such as fifty percent. An opponent may be able to tell if a building were on the verge of collapse by the percentage of lightly colored bricks in its structure and deliberately target structures on the verge of collapse, like a lion noticing a weakened antelope through the cue of a limp Therefore an opponent strong in a given subject could challenge opponents who are visibly weak in the given subject and by answering more questions correctly in a shorter period of time than the challenged opponent, and thereby collapse the opponent's tower. In a challenge, or head-to-head, game, both players may be represented by towers attacking each other, and presented with the same set of questions. The student to correctly complete the questions the quickest may be be the victor, with the "loser" seeing more damage to the tower in the form of further question/block decay, and complete collapse of the tower should the decay pass a settable level. Through such methods students may be induced to review their knowledge of subjects they care about before they forget items.

In addition to spacing theory, another feature may map incremental rewards to the physical metaphors employed in the system. In a preferred embodiment, one such reward is the student seeing the tower grow each time successfully completing a level. Another example of incremental rewards may be receipt of metaphorical gold coins upon the completion of each entire tower that can be used to "buy" enhancements, known in the game industry as "virtual goods," for the game. Virtual goods can consist of anything the student finds interesting: purely aesthetic game enhancements, for example as shown in FIG. 3, a unicorn 384, dragon 382, or goblin 386 which are often attractive to players in video game design, or functional enhancements that are physical metaphors that offer hints to the student. Yet another learning reinforcement method may be delivery of a note sent to an authority figure, such as a parent, other relative, or teacher, requesting praise in reward for completing a learning sequence. For example, the preferred embodiment may offer a "Praise Me" button upon completion of a tower representing a subject sequence. The Praise Me button may send email to the configured authority figure, who in turn is expected to send back a congratulatory note.

An additional feature is the requirement of a certain level of knowledge of a given level required to get to next level. In a preferred embodiment, a default percentage of correct answers, for example eighty percent correct, is required to progress from one level to the next. Concomitant with this may be use of a timer to induce the student to progress through a level as quickly as possible.

Both learning research and game research show that a student or player will only persist so long to complete a given level of knowledge or of a game. The preferred embodiment uses a fixed optimal time limit for a player to complete a given level. For example, a time limit of seven minutes may be set for a student to complete the construction of a building level. Should the complexity of the level change, or number of questions increase or decrease, the amount of time may be adjusted but preferably tuned to maintain the participant's interest. Likewise, learning research and game research show that there is an optimal number of actions a student or player will take in completing a given level before losing motivation to continue. This may be incorporated in the graininess of the mapping of knowledge to a physical metaphor. For example, a preferred embodiment breaks cities up into buildings of one hundred questions each, and breaks buildings into ten levels of ten questions each.

In a variation of timing levels to retain participant interest, timing may be adjusted based on improving performance. For example, in an alternative embodiment the time limit per level may be set so that a fixed percentage of students, such as 80%, successfully pass the level within two attempts.

Another feature is mapping incorrectly answered questions to a physical metaphor. For example, a preferred embodiment uses the color of construction materials to signify missed questions.

Another feature is the usage of questions that are variations of each other. This technique is used to prevent the student from merely memorizing the answer to a given question and instead induces understanding the logic of the question rather than simply associating a fixed answer with it. This may also be mapped to a physical metaphor, for example through a variation in the appearance of construction materials. Two versions of the same question may be represented by, for example, different colored bricks in a building.

Features specific to computer programs, and general computer games, may also be mapped to physical metaphors. For example, in the preferred embodiment a user may rate a building based on a scale of 5 and a higher or lower rating of a building by users may be mapped to the image of the building in various ways, such as its height and color.

Another feature may be permissions, where in the preferred embodiment a tower may be invisible to a user if he is not permissioned to see it.

In addition to students playing and participating, another feature is a facility for the creation of mappings of knowledge to physical metaphors by users, i.e. content creation utilities that make it easy to create content mapped to physical metaphors. These utilities can exist on all levels of the knowledge hierarchy. A user can thus create physical mappings for any level of the hierarchy, such as the City shown in FIG. 2, or a region of such cities, or a country, a continent, a world, a solar system, a group of solar systems, a galaxy, etc.

In the preferred embodiment a user may build a level of knowledge corresponding to a building in a city by adding questions and answers to each level with a Tower Wizard for inputting details about a tower and subject matter area.

Referring also to FIG. 4b, the content creation Tower Wizard provides for easy input from the content creator of key information about the subject tower and supplementary to it, for instance, its name 430, a supplementary description of the tower that can be longer than the name 435, a recommended age or age range 440 for the subject matter, keyword "tags" 445 to help find the tower when searching among a large number of towers, recommended books or the book upon which the tower content is based 450, and a search box 455, in a preferred embodiment for searching a database of questions for ones that the content creator would like to include in the tower. Many more data fields that would be helpful to content creation are possible.

A content creator may use whatever user interface devices facilitate rapid and painless creation of a subject tower, such as "dragging and dropping" existing questions from a database list 460 into any level 465 of the tower, such as question 470 placed as question 3 in level 1.

A second utility for easy content creation is a Question Wizard. A content creator can access the Question Wizard from the Tower Wizard by user interface devices, such as double-clicking on an existing question to edit it or in a blank area 475 of any level to create a new question for that level of the hierarchy.

As with the Tower Wizard, which uses the prevalent format in standardized tests of multiple choice questions to train the student, the Question Wizard may provide for easy input from the content creator of key information about the subject question and supplementary information. Referring also to FIG. 4c, the content creator may enter, for instance, the recommended student age or age range 480 for the question; keyword tags 482 to help find the question when searching among a large number of them; reference information 484 that could be a website address, link to a graphic or video, or other pointer to supplementary information relevant to the question; the wording of the question itself 486; the correct answer to the question 488; incorrect answers (known as "distractors") 490; a space for entering editorial comments 492 on the question by its creator and quality assurance reviewers; and also view the history 494 of any such editorial comments. Many more data fields that would be helpful to content creation are also possible.

It is to be understood that the above description of the present invention is intended to be illustrative, and not restrictive. Many other embodiments will be apparent to those of skill in the art upon reviewing the above description. The scope of the invention should, therefore, be determined with reference to the appended claims of the regular patent application to be filed and referencing this provisional application, partially indicated by the draft claims below, along with the full scope of equivalents to which such claims are entitled.

What is claimed is:

1. A method of operating a computer game, comprising:
    operating a server computer system managing a body of knowledge;
    delivering a client software application to a user computer device;
    rendering, on the user computer device, a game interface to the body of knowledge;
    mapping, within the game interface, a graphical representation of a physical metaphor representing structure of the body of knowledge;
    organizing the body of knowledge subject material sequentially;
    mapping, within the game interface, the sequence to the structure of the physical metaphor;
    structuring the body of knowledge subject matter hierarchically, wherein the body of knowledge is question and answer material and wherein the hierarchy has at least three levels of structure;
    mapping, within the game interface, hierarchical structure of the physical metaphor to the hierarchical structure of the body of knowledge;
    mapping learning techniques to the physical metaphor;
    presenting, within the game interface rendered on the user computer device, ordered questions from a lowest level of the hierarchical structure;
    tracking, by the server computer, correct and incorrect user responses to determine if a user successfully understands the material at the level presented;

allowing access to one or more further levels after the user successfully demonstrates a minimum understanding of the level presented;

displaying, within the game interface rendered on the user computer device, a graphical change in the representation of the physical metaphor indicating successful completion after a user successfully demonstrates a minimum understanding of the level presented;

determining, by the server computer, a target refresh time to re-present the questions of a previously successfully completed level based on the spacing effect; and displaying, within the game interface rendered on the user computer device, a state of decay of the representation of the physical metaphor connected to successfully understood levels, wherein the degree of decay is based on proximity to the target refresh time and designed to induce re-completion of the level by the user closest to the target refresh time.

2. The method of claim 1, wherein the target refresh time is determined based on the performance of all users who have successfully completed the same level.

3. The method of claim 1, wherein the target refresh time is determined based on the performance of the individual user across all levels successfully completed by the user.

4. The method of claim 1, wherein the target refresh time is determined per question, and set at the average time across all users of the time to next incorrect answer of a question previously answered correctly.

5. The method of claim 1, wherein the target refresh time is determined based on the average time across all users such a fixed percent of the users will successfully re-complete a level on a single re-attempt and the remaining users will require more than one re-attempt to successfully re-complete the level.

6. The method of claim 1, further comprising determining a second target refresh time which, if exceeded, results in complete collapse of the representation of the physical metaphor.

7. The method of claim 1, wherein users are grouped based on similarity of performance and performance statistics of a group are used to determine the target refresh times for all members of the group.

8. The method of claim 1, wherein the degree of decay is represented by the saturation of color of materials used in the graphical representation of the physical metaphor, and the saturation is determined by a formula based on elapsed time since last completion and the target refresh time.

9. The method of claim 1, further comprising a first user challenging a second user, wherein both users are presented the same level of questions and the fastest to successfully complete the level wins the challenge.

10. The method of claim 9, further comprising collapsing the graphical representation of the physical metaphor of the loser of the challenge if the decay prior to the challenge represented fifty percent or more of the material needed refresh based on the target refresh time.

11. The method of claim 9, further comprising displaying the graphical representation of physical metaphors including decay of the second user to the first user, so the first user can identify based on visual decay the weak points of the second user to better select a focus area or specific lesson for challenge.

\* \* \* \* \*